United States Patent [19]

Ricard et al.

[11] 3,904,670

[45] Sept. 9, 1975

[54] BUTACAINE PAMOATE

[75] Inventors: René Ricard; Miguel Margarit Tayá; Dionisio Martin Aedo, all of Barcelona, Spain

[73] Assignee: Rocador Sociedad Anonima, Barcelona, Spain

[22] Filed: Jan. 8, 1974

[21] Appl. No.: 431,810

[30] Foreign Application Priority Data
Jan. 18, 1973 Spain .................................. 410734

[52] U.S. Cl. ................................. 260/472; 424/310
[51] Int. Cl.² ..................................... C07C 101/056
[58] Field of Search ..................................... 260/472

[56] References Cited
UNITED STATES PATENTS
2,662,888  12/1953  Clinton et al. ..................... 260/472

*Primary Examiner*—Anton H. Sutto
*Assistant Examiner*—L. A. Thaxton
*Attorney, Agent, or Firm*—Sughrue, Rothwell, Mion, Zinn and Macpeak

[57] ABSTRACT

A new anaesthetic, butacaine pamoate, the anaesthetic properties of which only appear in acid media having a pH under 5 and alkaline media having a pH above 8, and the process for preparation thereof, consisting in reacting pamoic acid or one of its alkaline salts with butacaine or an acid salt thereof in an alcoholic medium is disclosed.

1 Claim, No Drawings

BUTACAINE PAMOATE

FIELD OF THE INVENTION

This invention relates to a new organic compound having valuable pharmaceutical activity and to a process for the preparation of said compound.

In particular the invention relates to butacaine pamoate having the following structure:

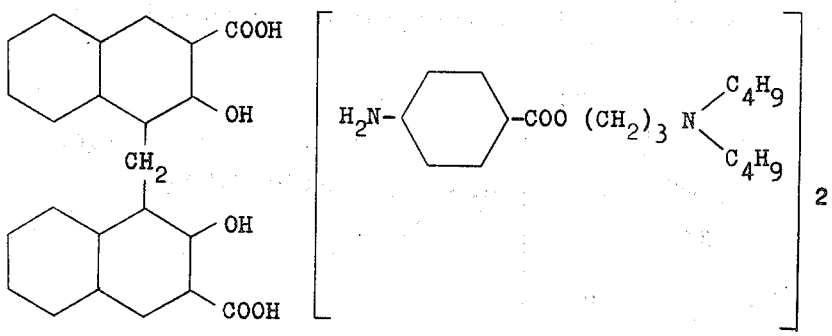

DESCRIPTION OF PRIOR ART

As is known, local anesthetics have recently been introduced into the therapy of chronic organic and reflex gastric disorders. Good results have been obtained and the heartburn, pain and reflex aerophagy caused by ulcerous gastroduodenal gastritis and by other abdominal affections have been calmed and caused to remit.

One disadvantage to the use of such preparations is the unpleasant anesthesia caused in the upper digestive tract (mouth and oesophagus), which means the great limits are placed on the pharmaceutical form to be used.

In order to overcome the above disadvantages, it would be desirable to have a product insoluble in a neutral medium of pH between 5 to 8 and containing a basic anaesthetic releasable in acid or alkaline media having respective pH values under 5 or over 8.

SUMMARY OF THE INVENTION

A primary object of the invention, therefore, is to provide a product having the above characteristics, namely butacaine pamoate.

A further object of the invention is to provide a process for the preparation of this product, wherein pamoic acid or an alkaline salt thereof, is caused to react completely in an alcoholic medium with butacaine, or an acid salt of butacaine; the resultant reaction product being butacaine pamoate. This product is hydrolysable in acid media having a pH under 5 and in alkaline media having a pH over 8.

DETAILED DESCRIPTION OF THE INVENTION

The invention will be more fully understood from the examples which follow and which, in view of their illustrative nature, must be considered as devoid of any limiting effect on the scope of the legal protection applied for.

EXAMPLE I 250 g sodium pamoate, 397 g butacaine hydrochloride, 3 litres methanol and 5 g activated carbon are placed in a 10 litre Quickfit flask, fitted with a heating jacket, and the mixture is refluxed for two hours. Thereafter it is filtered whilst hot, precipitates on cooling and 7 litres water are added slowly with stirring. The mixture is placed in a refrigerator for at least 4 hours, the liquid is decanted off and the precipitate formed is dissolved in 3 litres methanol. The mixture is boiled with activated carbon refiltered whilst hot and concentrated under vacuum until the volume is reduced to about 1500 ml. 4 litres isopropanol are added, the mixture is placed overnight in a refrigerator, and thereafter filtered and dried in vacuum at 50°C.

About 475 g of product are obtained; Yield 80–85%; butacaine content: 59–61 wt% of product obtained.

The butacaine pamoate thus prepared is a tasteless, odorless, pale yellow crystalline powder having a molecular weight of 1001.2, m.p. 75°–85°C, with decomposition. Is insoluble in water, soluble in methanol and dimethylformamide.

EXAMPLE II 355 g butacaine sulphate are dissolved in water and 2 litres chloroform are added, the solution is shaken vigourously and made alkaline. The chloroform phase is separated and washed 2 or 3 times with water.

The chloroform phase is dried with anhydrous sodium sulphate, concentrated and dried by elimination of the chloroform.

The basic butacaine thus obtained is dissolved in methanol. A separate suspension is prepared of 213 g pamoic acid in 150 ml methyl alcohol. The suspension is heated to 50°–60°C and the butacaine methanol solution is added slowly thereto, whereby the product goes completely into solution. Thereafter it is filtered, decolorised with activated carbon, and concentrated to give an oil which is recrystallised as in Example I.

445 g of product are obtained. Yield 89%.

The salt prepared according to the invention, i.e., butacaine pamoate, releases the basic anaesthetic in an acid medium, such as artificial gastric juice, whereby the anaesthetic activity of the butacaine, as shown in the following comparative test, is exhibited.

The following solutions are prepared:

a. butacaine pamoate suspension: 100 mg/10 ml water;
b. butacaine pamoate suspension: 100 mg/10 ml artificial gastric juice;
c. butacaine sulphate solution: 71 mg/10 ml water.

The inner surface of the ears of two rabbits are moistened with the above prepared solutions, using cotton wool. The anaesthetic action is cheeked at periods of 15, 30 and 60 minutes by pricking the contact zone with a hypodermic needle. The following results are obtained:

Suspension (a) (butacaine pamoate in water): there is response to pain.

Suspension (b) (butacaine pamoate in gastric juice): there is no response to pain.

Suspension (c) (butacaine sulphate in water): there is no response to pain.

These tests show:

1. that product (c) i.e., butacaine sulphate has the disadvantage indicated at the beginning of causing an anaesthetic effect in aqueous solution. In this type of treatment of gastric disorders, this causes unpleasant effects in the upper portion of the digestive apparatus (mouth and oesophagus).

2. On the contrary, butacaine pamoate in aqueous suspension (product a) has no anaesthetic activity, whereby it may be ingested without causing any unpleasant effects whatsoever and it is precisely in suspension in gastric juice (product b) when the anaesthetic effects of the butacaine appear.

What I claim is:

1. Butacaine pamoate having the following structure:

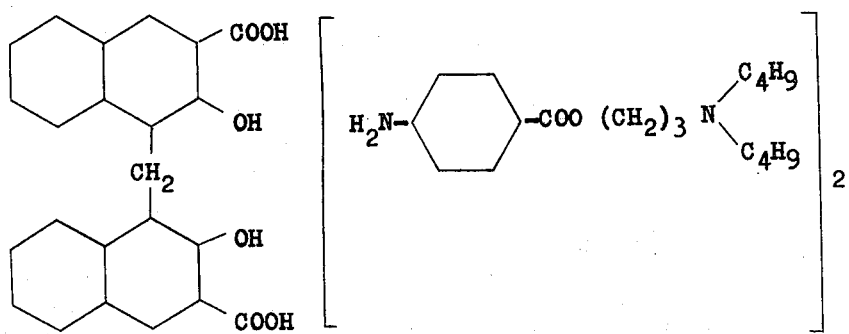

* * * * *